US006835297B1

(12) United States Patent
Yokota et al.

(10) Patent No.: US 6,835,297 B1
(45) Date of Patent: Dec. 28, 2004

(54) HIGH CURRENT DENSITY ELECTROLYTIC DECOMPOSITION PROCESS FOR COPPER

(75) Inventors: Toshiko Yokota, Saitama (JP); Susumu Takahashi, Saitama (JP); Makoto Dobashi, Saitama (JP); Yoshiaki Kinoshita, Saitama (JP)

(73) Assignee: Mitsui Mining and Smelting Co., Ltd., Tokyo (JP)

( * ) Notice: Subject to any disclaimer, the term of this patent is extended or adjusted under 35 U.S.C. 154(b) by 137 days.

(21) Appl. No.: 10/070,748

(22) PCT Filed: Jun. 9, 2000

(86) PCT No.: PCT/JP00/03769

§ 371 (c)(1),
(2), (4) Date: Jun. 24, 2002

(87) PCT Pub. No.: WO01/20062

PCT Pub. Date: Mar. 22, 2001

(30) Foreign Application Priority Data

Sep. 10, 1999  (JP) ............................................ 11-256774

(51) Int. Cl.[7] .................................................. C25C 1/12

(52) U.S. Cl. ....................................... 205/574; 205/575

(58) Field of Search ................................... 205/574–586

(56) References Cited

U.S. PATENT DOCUMENTS

| 4,033,839 | A | * | 7/1977 | Harvey et al. | 205/561 |
| 4,061,559 | A | * | 12/1977 | Kitamura et al. | 205/574 |
| 4,282,082 | A | * | 8/1981 | Cook et al. | 204/237 |
| 5,855,756 | A | * | 1/1999 | Anzalone, III | 205/334 |

FOREIGN PATENT DOCUMENTS

JP         51-093719        8/1976

* cited by examiner

*Primary Examiner*—Donald R. Valentine
(74) *Attorney, Agent, or Firm*—Young & Thompson

(57) ABSTRACT

The method for electrolytically refining copper makes use of crude copper as an anode and is characterized in that the temperature of the electrolyte in an electrolytic cell is maintained at a level of not less than 55° C.; that the electrolyte is continuously introduced into the electrolytic cell from the top of the cell, continuously discharged from the bottom of the cell along with slime, the slime is removed from the electrolyte discharged from the electrolytic cell and the electrolyte free of any slime is recirculated in the cell; and that the electrolyte is passed through the space between the electrodes at an average electrolyte velocity sufficient for allowing the electrolyte to flow on the whole surface of the cathode downward or in the direction opposite to that of the upward stream of the electrolyte generated on the cathode surface when the electrolysis is initiated while the electrolyte is in the stationary state.

19 Claims, 1 Drawing Sheet

HIGH CURRENT DENSITY ELECTROLYTIC DECOMPOSITION PROCESS FOR COPPER

TECHNICAL FIELD

The present invention relates to a method for electrolytically refining copper at a high current density and more specifically to a method for electrolytically refining copper at a high current density, which never causes any passivation of the anode even when copper is subjected to electrolytic refining at a high current density, which never causes any adhesion of slime to the surface of the cathode, which never forms any nodule (particulate copper) and wrinkle-like unevenness on the cathode surface and which permits an increased yield of high purity copper without increasing the number of electrolytic cells.

BACKGROUND ART

In the electrolytic refining of copper, the electrolysis is in general carried out at a current density ranging from 200 to 350 A/m$^2$. In this respect, if copper can electrolytically be refined while further increasing the current density, it would be possible to achieve an increased yield of refined copper without increasing the number of electrolytic cells. If the current density is increased, however, not only the anode undergoes passivation, but also wrinkle-like unevenness is generated on the cathode surface due to the enhancement of the spontaneous convection current generated in the space between the anode and the cathode. Moreover, another problem concerning the electrolytic refining of copper arises such that the slime suspended in the electrolyte adheres to the cathode surface to thus form nodules (particulate copper) on the cathode surface. In any case, the purity of the resulting electrolytically refined copper is reduced.

According to the conventional electrolyte circulation system used in the electrolytic refining of copper, the electrolyte is circulated at a velocity of not more than 0.2 m/s or in such a manner that the electrolyte is maintained at a state almost identical to the stationary state in order to prevent any suspension, in the electrolyte, of the slime adhered to the anode surface or settled on the bottom of the electrolytic cell. The use of such a low velocity of the electrolyte never permits the smooth supply of copper to the electrolytic cell and therefore, this makes any increase in the current density impossible.

In addition, there has been proposed a PR electrolysis method as a high current electrolytic refining process of copper. In this case, however, it is likewise necessary to circulate the electrolyte while maintaining such a condition that the electrolyte is substantially free of any suspension of the slime adhered to the anode surface or settled on the bottom of the electrolytic cell and in other words, the circulation rate of the electrolyte (the velocity of the electrolyte in the electrolytic cell) cannot be increased so much. For this reason, the current density can be increased only in limited extents. Furthermore, there has also been proposed a high current density electrolytic refining technique, which makes use of a channel-type electrolytic cell.

As will be clear from the foregoing description, it would be impossible to increase the current density in the electrolytic refining of copper simply by raising the circulation rate of the electrolyte (the velocity of the electrolyte in the electrolytic cell) without causing any problem, unless the slime suspended in the electrolyte is removed.

Accordingly, there has still been required for the development of a high current density electrolytic refining method of copper, which permits the solution of all of the problems concerning the passivation of the anode, any adhesion of slime onto the cathode surface, any formation of nodules (particulate copper) and/or wrinkle-like unevenness on the cathode surface and any reduction of the purity of the resulting copper and which permits the achievement of an increased yield of refined copper without increasing the number of electrolytic cells.

Accordingly, it is an object of the present invention to provide a high current density electrolytic refining method of copper, which never causes any passivation of the anode even when copper is electrolytically refined at a high current density, which never causes any adhesion of slime to the surface of the cathode, which never forms any nodule (particulate copper) and wrinkle-like unevenness on the cathode surface and which can ensure an increased yield of high purity copper without increasing the number of electrolytic cells.

DISCLOSURE OF THE INVENTION

The inventors of this invention have conducted various studies to achieve the foregoing object, have found that the foregoing problems associated with the conventional techniques can be eliminated by maintaining the electrolyte accommodated in an electrolytic cell at a temperature not less than a predetermined level, pouring the electrolyte into the electrolytic cell from the top thereof and discharging the same out of the bottom of the cell together with the slime and recirculating the electrolyte into the electrolytic cell after the removal of the slime, to thus allow the electrolyte to flow downward on the whole surface of the cathode and have thus completed the present invention.

Therefore, the method for electrolytically refining copper at a high current density according to the present invention relates to the electrolytic refining of copper, which makes use of crude copper as an anode, and is characterized in that the temperature of the electrolyte in an electrolytic cell is maintained at a level of not less than 55° C.; that the electrolyte is continuously introduced into the electrolytic cell from the top of the cell, continuously discharged from the bottom of the cell along with slime, the slime is removed from the electrolyte discharged from the electrolytic cell and the electrolyte free of any slime is recirculated in the cell; and that the electrolyte is passed through the space between the electrodes at an average electrolyte velocity sufficient for allowing the electrolyte to flow on the whole surface of the cathode downward or in the direction opposite to that of the upward stream of the electrolyte generated on the cathode surface when the electrolysis is initiated while the electrolyte is in the stationary state.

BEST MODE FOR CARRYING OUT THE INVENTION

Figure 1:
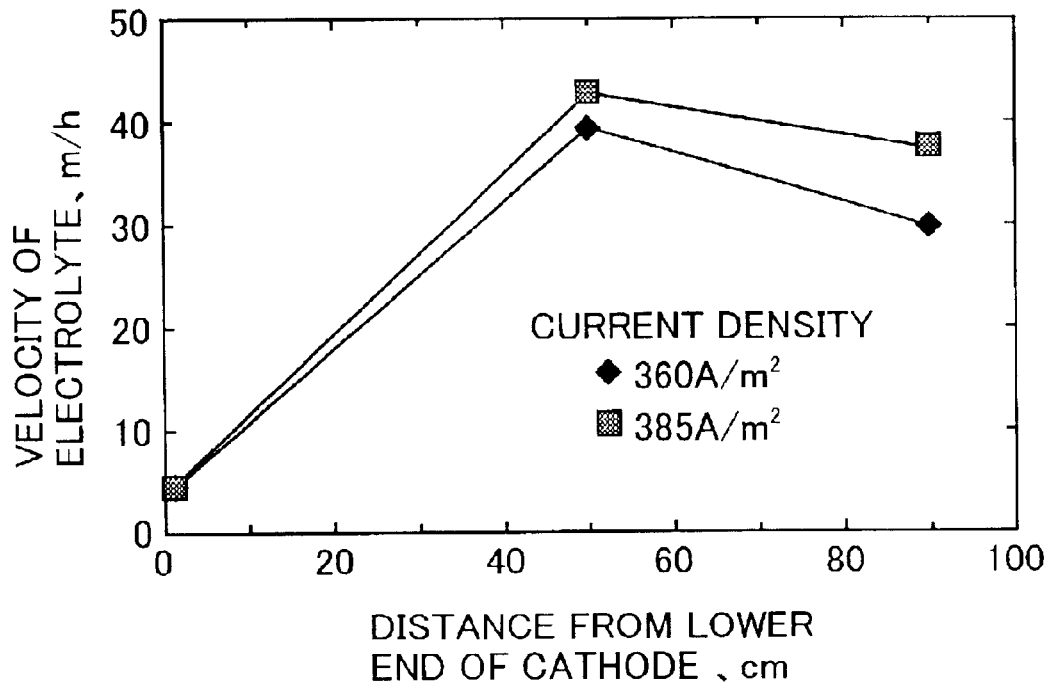
FIG. 1 is a graph showing the relation between the vertical distance on the cathode surface from the lower end of a cathode and the velocity of an electrolyte, observed in Test Example 1

The inventors of this invention will hereunder specifically describe the details how they have completed the present invention and the method for electrolytically refining copper at a high current density according to the present invention.

The inventors of this invention initiated electrolysis while the electrolyte in an electrolytic cell was in a stationary state and observed the flow condition of the electrolyte on the surface of a cathode and that of the electrolyte on the surface of an anode. The flowing condition of the electrolyte was observed by dispersing, in the electrolyte, a tracer such as fine particles of a pigmented resin having a specific gravity almost identical to that of the electrolyte.

The electrolyte upward flows on the cathode surface, while it downward flows on the anode surface to thus cause a spontaneous convection current within the space formed between the cathode and the anode. In this respect, an upward flow is generated on the whole surface of the cathode, but the velocity of the upward electrolyte stream varies depending on the difference between positions on the cathode surface in the vertical direction, as will be clear from Test Example 1 detailed later. More specifically, the inventors have found that the velocity thereof is gradually increased from the lower end to the middle of the cathode and it is gradually reduced from the middle to the upper end of the cathode or the velocity of the upward electrolyte stream is maximized at the middle of the cathode in the vertical direction and it is minimized at the lower end of the cathode.

Making the electrolyte flow into the electrolytic cell at high speed from the bottom thereof and allowing the same to flow out of the cell at the top thereof can accelerate the flow rate of the electrolyte on the cathode surface. In this case, however, a problem arises such that the slime is caught in the stream of the electrolyte. Contrary to this, if the electrolyte is poured into the electrolytic cell from the top thereof and discharged from the bottom of the electrolytic cell to thus establish a downward electrolyte stream on the whole surface of the cathode, the average velocity of the electrolyte passing through the space between the electrodes must be determined while taking into consideration the velocity of the electrolyte at the middle of the cathode in the vertical direction.

Moreover, when the electrolysis is initiated at a variety of current densities while the electrolyte in the electrolytic cell is in a stationary state and the upward stream of the electrolyte generated on the cathode surface; is observed, it has been found that the higher the current density, the higher the velocity of the upward electrolyte stream, as will be detailed below in Test Example 2.

The electrolysis was conducted by continuously pouring the electrolyte into the electrolytic cell from the top thereof so that the electrolyte was passed through the space between the electrodes at a variety of average electrolyte velocities and the electrolyte was continuously allowed to flow out of the cell from the bottom thereof and the flow behavior of the electrolyte on the cathode surface was observed. In this connection, the velocity of the electrolyte passing through the space between the electrodes varies from the central portion between the electrodes to the portions close to the electrodes and therefore, the average velocity of the electrolyte used herein means the value determined on the basis of the horizontal cross section of the space between the electrodes (the area through which the electrolyte passes) and the flow rate of the electrolyte. When the average velocity was considerably low, the electrolyte, as a whole, flowed downward, but the electrolyte flowed upward on the cathode surface. When the average velocity of the electrolyte was increased to some extent, the electrolyte present on the cathode surface comprised an upward flow region, a downward flow region and a turbulent flow region. When the average velocity of the electrolyte was further increased slightly, the electrolyte downward flowed on the majority of the cathode surface, but it flowed upward on a part of the cathode surface (on the middle of the cathode surface in the vertical direction) and there was also observed a turbulent flow region. When the electrolysis was continued under such conditions, nodules, nodules (particulate copper) and/or wrinkle-like unevenness were formed on the cathode surface.

When the average velocity of the electrolyte was further increased, the electrolyte flowed downward on the whole surface of the cathode. When the electrolysis was continued under such conditions, any nodule (particulate copper) and/or wrinkle-like unevenness were not formed on the cathode surface and the resulting copper had a considerably high purity. As has been described above, the velocity of the upward stream of the electrolyte is maximized at the middle of the cathode in the vertical direction and therefore, it would be concluded that the average velocity of the electrolyte sufficient for allowing the electrolyte to flow on the whole surface of the cathode downward or in the direction opposite to that of the upward stream of the electrolyte generated on the cathode surface when the electrolysis is initiated while the electrolyte is in the stationary state closely correlates with the velocity of the upward electrolyte flow observed at the middle of the cathode surface.

The electrolysis is conducted at a current density on the order of 200 to 350 A/m$^2$ in the conventional techniques as has been discussed above and therefore, the current density is preferably increased to a level of higher than 350 A/m$^2$ and more preferably not less than 400 A/m$^2$ in the present invention. For this reason, as the average velocity of the electrolyte sufficient for allowing the electrolyte to flow on the whole surface of the cathode downward or in the direction opposite to that of the upward stream of the electrolyte generated on the cathode surface when the electrolysis is initiated while the electrolyte is in the stationary state, it is preferred and advantageous to use the average velocity of the electrolyte, which satisfies the following inequalities, if judging from the results obtained in the following Example:

$$X > 350;$$

$$600 \geq Y \geq 80; \text{ and}$$

$$Y \geq 250 \times \{(X-350)/350\}^{1/2}$$

wherein the current density is defined to be X A/m$^2$ and the average velocity of the electrolyte passing through the space between the electrodes is defined to be Y m/h, and it is more preferred to use the average velocity of the electrolyte, which satisfies the following inequalities:

$$X \geq 400 \text{ and}$$

$$Y \geq 260 \times \{(X-350)/350\}^{1/2}$$

In each of the foregoing inequalities, the values 350 and 400 concerning the current density X are the foregoing preferred current densities. The numerical value of 80 concerning the average velocity Y of the electrolyte is an average velocity of the electrolyte required for ensuring the downward electrolyte stream on the whole surface of the cathode even when the current density X is less than 386 A/m$^2$ (or when the value of $260 \times \{(X-350)/350\}^{1/2}$ is not more than 80). The numerical value of 600 concerning the average velocity Y of the electrolyte is the upper limit for continuing the electrolysis operation without imparting any particular load or burden to the electrolytic cell and/or the circulation pump and therefore, if the load applied to or the energy loss in the electrolytic cell and/or the circulation pump can be neglected, the electrolyzation operation can be continued even when the average velocity Y of the electrolyte is further increased. The numerical values of 250 and 260 are coefficients estimated on the basis of the results obtained in Example as will be detailed later.

In the high current density electrolyzation method of copper according to the present invention, it is necessary to maintain the temperature of the electrolyte contained in the electrolytic cell at a level of not less than 55° C., preferably not less than 60° C. and more preferably not less than 65° C. in order to prevent any passivation of the anode. When the temperature of the electrolyte contained in the electrolytic cell was maintained at 55° C., the anode voltage gradually increased as the electrolyzation operation was further continued after the continuation of the electrolyzation over a certain period of time, when a current density was high, but the electrolyzation operation could be continued to the last extremity. When the temperature of the electrolyte contained in the electrolytic cell was maintained at 60° C., the anode voltage gradually increased as the electrolyzation operation was continued after the further continuation of the electrolyzation over a long period of time, when a current density was high, but this exerted almost no influence on the electrolyzation efficiency. When the temperature of the electrolyte contained in the electrolytic cell was maintained at 65° C., there was not observed any increase of the anode voltage due to the continuation of the electrolyzation operation even when a high current density was used.

In the high current density electrolyzation method of copper according to the present invention, crude copper is used as the anode and the cathode used herein may be, for instance, a starting copper plate, a titanium plate or an SUS plate. In addition, the purity or the like of the crude copper, the kind of the cathode, the relative arrangement of the anode and cathode or the like may be the same as those used in the usual electrolytic refining method of copper.

In the high current density electrolyzation method of copper according to the present invention, the electrolyte is continuously introduced into the electrolytic cell from the top thereof and continuously discharged from the cell through the bottom thereof. At this stage, it is preferred that the electrolyte flows, without any contamination thereof with air (generation of air bubbles), uniformly through the spaces between each neighboring electrodes and in the vertical direction or under the conditions almost similar thereto. To this end, the following various methods can, for instance, be adopted:

A method comprising the steps of providing a plurality of thin pipes each having a slit extending along the longitudinal direction of the pipe; arranging these thin pipes in the spaces between the anodes and the cathodes and the exterior of the anodes on the both ends, in the direction parallel to that of the electrode plates of the electrolytic cell and immersing the pipes in the upper portion of the electrolyte; connecting these thin pipes to a conduit pipe positioned in the exterior of the electrolytic cell; and then pouring the electrolyte into the pipes through the conduit pipe to thus allow the electrolyte to uniformly flow through each space between neighboring two electrodes through the slits;

A method comprising the steps of forming, on a pipe, one or at least two slits extending along the longitudinal direction of the pipe or a plurality of slits extending along the direction perpendicular to the longitudinal direction of the pipe; arranging at least one such pipe on the both side walls of the electrolytic cell or above the electrodes, in the direction perpendicular to that of the electrode plates of the electrolytic cell (in this case, the shapes of the anodes and cathodes should be changed) and immersing these pipes in the upper portion of the electrolyte; connecting these pipes to a conduit pipe positioned in the exterior of the electrolytic cell; and then pouring the electrolyte into the pipes through the conduit pipe to thus allow the electrolyte to uniformly flow through each space between neighboring two electrodes through the slits;

A method, which comprises the steps of setting up a plurality of pipes for pouring an electrolyte; and immersing at least the tips of these pipes in the electrolyte, to thus allow the electrolyte to uniformly flow through each space between neighboring two electrodes through the pipes; or A method, which comprises the step of setting up current plates or forming the upper portion of an electrolytic cell into an inverted funnel-like shape to thus allow an electrolyte to uniformly flow through each space between neighboring two electrodes through the pipes.

On the other hand, it is also preferred to arrange, at the bottom of an electrolytic cell, a pipe provided with a plurality of holes through which an electrolyte can be discharged throughout the whole bottom of the electrolytic cell, to set up current plates on the bottom of the electrolytic cell or to form the bottom of the electrolytic cell into a funnel-like shape.

In the high current density electrolyzation method according to the present invention, the electrolyte is continuously discharged from the electrolytic cell together with the slime adhered to the anode surface, the slime suspended in the cell and that settled on the bottom of the cell. The slime is then removed from the electrolyte discharged from the electrolytic cell according to any well-known method such as filtration. The minimum particle size of the slime to be removed by, for instance, filtration varies depending on, for instance, the desired purity of the electrolytically refined copper, the quality of the anode used, and conditions for the electrolyzation such as the composition of the electrolyte used and therefore, the slime is removed while arbitrarily selecting the minimum retention particle size. For instance, the slime can be removed using a filter whose minimum retention particle size is not more than 100 $\mu$m, preferably not more than 20 $\mu$m and more preferably not more than 5 $\mu$m. The electrolyte from which the slime has been removed is recirculated in the electrolytic cell.

The high current density electrolyzation method of copper can be practicable in any electrolyzation method currently used for electrolytic refining of copper such as the usual direct current electrolyzation method in which the direction of the electric current is not reversed, the PR electrolyzation method and the pulse electrolyzation method. However, the desired effect of the present invention can sufficiently be accomplished by the usual direct current electrolyzation method and therefore, it is preferred to carry out the method of this invention according to the usual direct current electrolyzation method, while taking into account, for instance, the cost required for the device to be used and the operating properties.

The present invention will hereunder be described in more specifically on the basis of the following Test Examples and working Examples.

TEST EXAMPLE 1

An experimental electrolytic cell having the following inside dimensions: a width of 24 cm; a length (in the direction parallel to the surface of the electrode plates) of 7 cm; and a depth of 130 cm was produced using transparent acrylic resin plates. The anode used herein was a copper plate having a purity of 95% and the following dimensions:

a length of 100 cm; a breadth of 5 cm; and a thickness of 4 cm and the cathode used herein was a starting copper plate having a purity of 99.99% and the following dimensions: a length of 100 cm; a breadth of 5 cm; and a thickness of 0.07 cm. A sheet of this anode and a sheet of the cathode were placed in the experimental electrolytic cell in such a manner that the inter-electrode center-to-center distance between the anode and the cathode was equal to 5 cm. There was introduced, into the experimental electrolytic cell, an electrolyte obtained by dispersing, into an electrolyte having a copper concentration of 46 g/l and a free sulfuric acid concentration of 190 g/l, a tracer, which comprised fine particles of a pigmented resin having a specific gravity identical to that of the electrolyte. Moreover, in order to observe the flow condition of the electrolyte at any position on the cathode surface and along the vertical direction, during the practice of the electrolyzation, a CCD camera was installed on the outer side of the acrylic resin plate in the widthwise direction of the experimental electrolytic cell in such a manner that the camera could move up and down.

The temperature of the electrolyte accommodated in the electrolytic cell was maintained at 65° C. and the electrolyzation was separately carried out at current densities specified in the following Table 1 or 360 A/m$^2$ and 385 A/m$^2$. Then the flow condition of the electrolyte was observed at a variety of positions on the cathode surface in the vertical direction. The electrolyte upward flows at all of the positions examined, but the upward velocity of the electrolyte varies depending on the difference in the vertical position on the cathode surface as will be seen from the data listed in Table 1. More specifically, the velocity gradually increased from the lower end of the cathode to the middle thereof and then gradually decreased from the middle to the upper end of the cathode. In other word, the upward velocity of the electrolyte was maximized at the middle of the cathode in the vertical direction and was minimized at the lower end thereof.

TABLE 1

| Position of observation (vertical distance from the lower end of the cathode surface) | Current Density | |
|---|---|---|
| | 360 A/m$^2$ | 385 A/m$^2$ |
| 1 cm (the lower position on the cathode surface) | 4.1 m/h | 4.4 m/h |
| 50 cm (the middle position on the cathode surface) | 39.4 m/h | 42.9 m/h |
| 90 cm (the upper position on the cathode surface) | 29.9 m/h | 37.5 m/h |

FIG. 1 is a graph obtained by plotting the data listed in Table 1.

TEST EXAMPLE 2

The same electrolytic cell, electrolyte, anode, cathode and CCD camera used in Test Example 1 were arranged in the same manner used in Test Example 1. The temperature of the electrolyte accommodated in the electrolytic cell was maintained at 65° C. and the electrolyzation was separately carried out at each current density specified in the following Table 2 or 405 A/m$^2$, 616 A/m$^2$ or 917 A/m$^2$. Then the flow condition of the electrolyte was observed at a variety of positions on the cathode surface in the vertical direction. The electrolyte flowed upward at all of the positions examined, but the upward velocity of the electrolyte increased as the current density increased as will be seen from the data listed in Table 2.

TABLE 2

| Position of observation (vertical distance from the lower end of the cathode surface) | Current Density | | |
|---|---|---|---|
| | 405 A/m$^2$ | 616 A/m$^2$ | 917 A/m$^2$ |
| 10 cm | 22 m/h | 27 m/h | 30 m/h |
| 30 cm | 39 m/h | 52 m/h | 70 m/h |
| 50 cm | 48 m/h | 61 m/h | 79 m/h |

Figure 2:
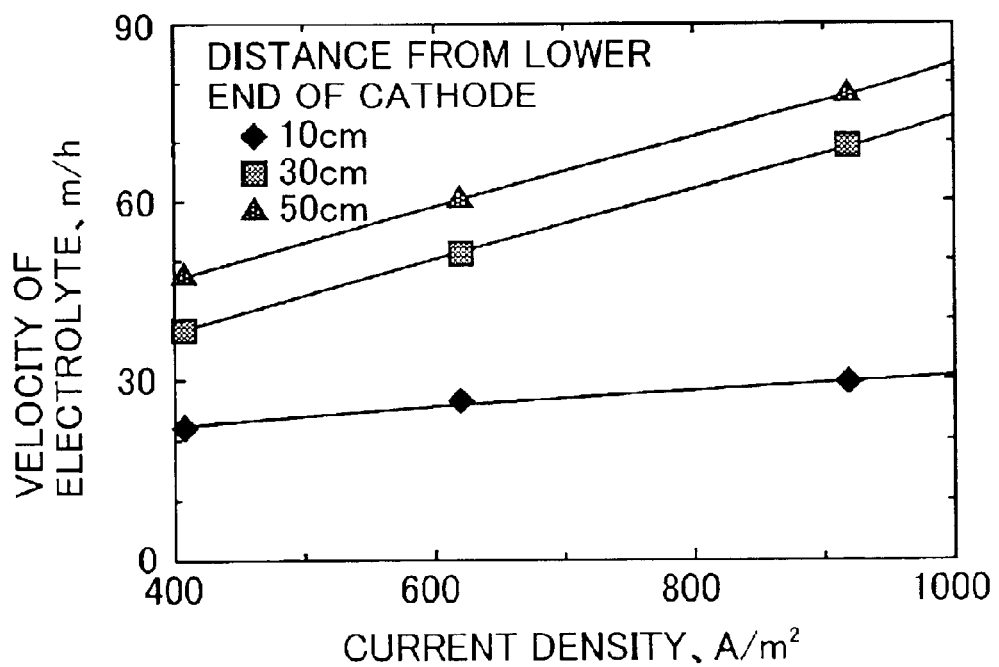
FIG. 2 is a graph showing the relation between the current density and the velocity of an electrolyte, observed in Test Example 2.

FIG. 2 is a graph obtained by plotting the data listed in Table 2.

EXAMPLE 1

In this Example, there was used an electrolytic cell of concrete lined with vinyl chloride resin, which had the following inside dimensions: a width of 486 cm; a length (in the direction parallel to the surface of the electrode plates) of 120 cm; and a depth of 130 cm. The tip of an acid resistant fiber scope was immersed in the electrolyte and a CCD camera was positioned at the basic end of the fiber scope, which was externally projected from the electrolytic cell so that the flow condition of the electrolyte could be observed at a position on the cathode surface about 50 cm distant from the lower end of the surface in the vertical direction during the electrolyzation. The anode used herein was a copper plate having a purity of 95% and the following dimensions: a length of 98 cm; a breadth of 96 cm; and a thickness of 4 cm and the cathode used herein was a starting copper plate having a purity of 99.99% and the following dimensions: a length of 100 cm; a breadth of 100 cm; and a thickness of 0.07 cm. The anodes (47 sheets) and the cathodes (46 sheets) were alternately placed in the foregoing electrolytic cell in such a manner that the inter-electrode center-to-center distance between each pair of neighboring anode and cathode was equal to 5 cm (the inter-electrode distance (center-to-center distance) currently used in the electrolytic refining technique for copper is 10 cm).

There were provided a plurality of thin pipes each having a slit extending along the longitudinal direction of the pipe and a length of 110 cm and an outer diameter of 2 cm. These thin pipes were assembled by connecting them to a conduit pipe positioned in the exterior of the electrolytic cell in such a manner that the pipes could be arranged parallel to the electrode plates in the electrolytic cell, in the space between each pair of the neighboring anode and cathode and in the exterior of the both terminal anodes while each slit pointed the downward direction and that they could be immersed in the upper portion of the electrolyte. Moreover, there was arranged, at the bottom of the electrolytic cell, a pipe provided with a plurality of holes through which an electrolyte could be discharged throughout the whole bottom of the electrolytic cell and the electrolyte-discharging pipe was connected to the external conduit pipe for introducing the electrolyte through a pump, a filter and a tailings cell so that the electrolyte could pass therethrough.

An electrolyte prepared by dispersing, into an electrolyte having a copper concentration of 46 g/l and a free sulfuric acid concentration of 190 g/l, a tracer, which comprised fine particles of a pigmented resin having a specific gravity identical to that of the electrolyte was used, followed by introducing the electrolyte into the electrolytic cell from the external electrolyte-introducing conduit pipe to thus allow the electrolyte to flow through each of the slitted pipes to thus uniformly make the electrolyte run through the spaces between each neighboring electrodes, discharging the electrolyte through the electrolyte-discharging pipe together with the slime and recirculating the electrolyte to the external electrolyte-introducing conduit pipe through the pump, the filter having a minimum retention particle size of 5 μm and the tailings cell.

The temperature of the electrolyte in the electrolytic cell was maintained at 65° C. and the electrolyzation was carried out at a current density specified in the following Table 3 over a time likewise specified in Table 3, while the electrolyte was circulated at an average velocity of the electrolyte between the electrodes as shown in Table 3. The flow condition of the electrolyte was observed at a position on the cathode surface about 50 cm distant from the lower end of the surface in the vertical direction during the electrolyzation. The results thus obtained are shown in Table 3. After the completion of the electrolyzation, the anode was inspected for the presence of any passivation. The results obtained are also shown in Table 3. Further, the resulting electrolytically refined copper was inspected for the surface configuration and the presence of impurities and the results obtained are summarized in Table 3. Moreover, to make clear the relation between the average velocity of the electrolyte between the electrodes and the current density required for the achievement of the intended effects of the present invention, the values of the following equation were calculated while assuming the current density to be X A/m² and the results obtained are likewise listed in the following Table 3:

$$250 \times \{(X-350)/350\}^{1/2}$$

As will be clear from the data listed in Table 3, the use of the method for electrolytically refining copper at a high current density according to the present invention would permit the production of electrolytically refined copper, which has only a low content of impurities such as S, As, Sb and Bi, without causing any passivation of the anode even when copper is electrolytically refined at a high current density, any adhesion of slime to the cathode surface and generation of any nodule (particulate copper) and/or wrinkle-like unevenness on the cathode surface.

What is claimed is:

1. A method for electrolytically refining copper, which makes use of crude copper as an anode, the method being characterized in that the temperature of the electrolyte in an electrolytic cell is maintained at a level of not less than 55° C.;

that the electrolyte is continuously introduced into the electrolytic cell from the top of the cell, continuously discharged from the bottom of the cell along with slime, the slime is removed from the electrolyte discharged from the electrolytic cell and the electrolyte free of any slime is recirculated in the cell; and that the electrolyzation is carried out under conditions, which satisfy the following inequalities:

$$X>350;\ 600 \geq Y \geq 80;\ \text{and}\ Y \geq 250 \times \{(X-350)/350\}^{1/2}$$

wherein the current density is defined to be X A/m² and the average velocity of the electrolyte passing through a space between electrodes is defined as Y m/h, whereby the electrolyte is passed through the space between the electrodes at an average velocity of the electrolyte sufficient for allowing the electrolyte to flow on a whole surface of a cathode downward or in the direction opposite to that of an upward stream of the electrolyte generated on a cathode surface when the electrolysis is initiated while the electrolyte is in the stationary state.

2. The method for electrolytically refining copper at a high current density according to claim 1, wherein the temperature of the electrolyte in the electrolytic cell is maintained at a level of not less than 60° C.

3. The method for electrolytically refining copper at a high current density according to claim 2, wherein the cathode used is a starting copper plate, a titanium plate or an SUS plate.

4. The method for electrolytically refining copper at a high current density according to claim 3, wherein slime is removed using a filter having a minimum retention particle size of not more than 20 μm.

5. The method for electrolytically refining copper at a high current density according to claim 4, wherein the

TABLE 3

| Current Density, A/m² | | 405 | | | 616 | | | 917 | | |
| --- | --- | --- | --- | --- | --- | --- | --- | --- | --- | --- |
| Average velocity of the electrolyte in the space between the electrodes, m/h | 48 | 120 | 240 | 48 | 120 | 240 | 48 | 120 | 240 | 336 |
| 250 × {(X − 350)/350}^(1/2) | 100 | 100 | 100 | 218 | 218 | 218 | 318 | 318 | 318 | 318 |
| Electrolyzation Time, h | 161 | 161 | 161 | 105 | 105 | 105 | 71 | 71 | 71 | 71 |
| Flow condition of the electrolyte at a position on the cathode surface about 50 cm distant from the lower end of the cathode | upward | downward | downward | upward | Note 1 | downward | upward | Note 1 | Note 1 | downward |
| Presence of the passivation of the anode | None | None | None | None | None | None | None | None | None | None |
| Surface configuration of the resulting electrolytically refined copper | Nodule | Smooth | Smooth | Nodule | Nodule | Smooth | Nodule | Nodule | Nodule | Smooth |
| Results of Analysis | | | | | | | | | | |
| Concentration of S, ppm | 20 | <10 | <10 | 30 | <10 | <10 | 90 | 30 | <10 | <10 |
| Concentration of As, ppm | 0.4 | <0.3 | <0.3 | 0.5 | 0.4 | <0.3 | 3.9 | 2.7 | 0.9 | <0.3 |
| Concentration of Sb, ppm | 0.3 | <0.3 | <0.3 | 0.4 | <0.3 | <0.3 | 0.8 | 0.4 | <0.3 | <0.3 |
| Concentration of Bi, ppm | 1.8 | <0.3 | <0.3 | 1.9 | 0.9 | <0.3 | 3.6 | 2.5 | <0.3 | <0.3 |

Note 1: The majority of the electrolyte flowed downward, but it was observed that a part of the electrolyte flowed slightly upward.

electrolyzation is carried out under conditions, which satisfy the following inequalities:

$$X>350;\ 600\geq Y\geq 80;\ \text{and}\ Y\geq 250\times\{(X-350)/350\}^{1/2}$$

wherein the current density is defined to be X A/m² and the average velocity of the electrolyte passing through the space between the electrodes is defined as Y m/h.

6. The method for electrolytically refining copper at a high current density according to claim 5, wherein the electrolyzation is carried out under conditions, which satisfy the following inequalities:

$$X>400\ \text{and}\ 600\geq Y\geq 260\times\{(X-350)/350\}^{1/2}.$$

7. The method for electrolytically refining copper at a high current density according to claim 6, wherein the electrolyzation is carried out without reversing the direction of the electric current.

8. The method for electrolytically refining copper at a high current density according to claim 2, wherein slime is removed using a filter having a minimum retention particle size of not more than 20 μm.

9. The method for electrolytically refining copper at a high current density according to claim 2, wherein the electrolyzation is carried out under conditions, which satisfy the following inequalities:

$$X>350;\ 600\geq Y\geq 80;\ \text{and}\ Y\geq 250\times\{(X-350)/350\}^{1/2}$$

wherein the current density is defined to be X A/m² and the average velocity of the electrolyte passing through the space between the electrodes is defined as Y m/h.

10. The method for electrolytically refining copper at a high current density according to claim 9, wherein the electrolyzation is carried out under conditions, which satisfy the following inequalities:

$$X>400\ \text{and}\ 600\geq Y\geq 260\times\{(X-350)/350\}^{1/2}.$$

11. The method for electrolytically refining copper at a high current density according to claim 2, wherein the electrolyzation is carried out without reversing the direction of the electric current.

12. The method for electrolytically refining copper at a high current density according to claim 1, wherein the cathode used is a starting copper plate, a titanium plate or an SUS plate.

13. The method for electrolytically refining copper at a high current density according to claim 12, wherein slime is removed using a filter having a minimum retention particle size of not more than 20 μm.

14. The method for electrolytically refining copper at a high current density according to claim 13, wherein the electrolyzation is carried out under conditions, which satisfy the following inequalities:

$$X>350;\ 600\geq Y\geq 80;\ \text{and}\ Y\geq 250\times\{(X-350)/350\}^{1/2}$$

wherein the current density is defined to be X A/m² and the average velocity of the electrolyte passing through the space between the electrodes is defined as Y m/h.

15. The method for electrolytically refining copper at a high current density according to claim 14, wherein the electrolyzation is carried out under conditions, which satisfy the following inequalities:

$$X>400\ \text{and}\ 600\geq Y\geq 260\times\{(X-350)/350\}^{1/2}.$$

16. The method for electrolytically refining copper at a high current density according to claim 15, wherein the electrolyzation is carried out without reversing the direction of the electric current.

17. The method for electrolytically refining copper at a high current density according to claim 1, wherein slime is removed using a filter having a minimum retention particle size of not more than 20 μm.

18. The method for electrolytically refining copper at a high current density according to claim 1, wherein the electrolyzation is carried out under conditions, which satisfy the following inequalities:

$$X\geq 400\ \text{and}\ 600\geq Y\geq 260\times\{(X-350)/350\}^{1/2}.$$

19. The method for electrolytically refining copper at a high current density according to claim 1 wherein the electrolyzation is carried out without reversing the direction of the electric current.

* * * * *